(12) United States Patent
Yoon et al.

(10) Patent No.: US 9,754,192 B2
(45) Date of Patent: Sep. 5, 2017

(54) OBJECT DETECTION UTILIZING GEOMETRIC INFORMATION FUSED WITH IMAGE DATA

(71) Applicant: Microsoft Corporation, Redmond, WA (US)

(72) Inventors: Taehun Yoon, Superior, CO (US); Aaron Rogan, Westminster, CO (US); Michael Harrell, Denver, CO (US); Bradford R. Clark, Broomfield, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/320,053

(22) Filed: Jun. 30, 2014

(65) Prior Publication Data
US 2015/0379371 A1 Dec. 31, 2015

(51) Int. Cl.
*G06K 9/62* (2006.01)
*G06K 9/00* (2006.01)

(52) U.S. Cl.
CPC ....... *G06K 9/6289* (2013.01); *G06K 9/00201* (2013.01)

(58) Field of Classification Search
CPC .............. G06F 17/30707; G06T 17/00; G06T 2200/04; G06T 11/00; G06K 9/00201; G06K 9/00208; G06K 9/78; G06K 9/6288
See application file for complete search history.

(56) References Cited

U.S. PATENT DOCUMENTS 6,901,398 B1 * 5/2005 Horvitz et al. ................ 709/207
6,912,293 B1 * 6/2005 Korobkin ................ G06T 17/10
345/420

(Continued)

OTHER PUBLICATIONS

Zhang, David, Vivek Kanhangad, Nan Luo, and Ajay Kumar. "Robust palmprint verification using 2D and 3D features." Pattern Recognition 43, No. 1 (2010): 358-368.*

(Continued)

*Primary Examiner* — Sumati Lefkowitz
*Assistant Examiner* — Carol Wang
(74) *Attorney, Agent, or Firm* — The Watson IP Group, PLC; Vladan M. Vasiljevic (57) ABSTRACT

Two-dimensional and three-dimensional data of a physical scene are combined and analyzed together to identify physical objects physically present in the physical scene. Image features obtained from the two-dimensional data and geometric features obtained from the three-dimensional data are combined with one another such that corresponding image features are associated with corresponding geometric features. Automated object detection mechanisms are directed to the combination of image and geographic features and consider them together in identifying physical objects from the physical scene. Such automated object detection mechanisms utilize machine learning such as selecting and tuning multiple classifiers, with each classifier identifying potential objects based on a specific set of image and geographic features, and further identifying and adjusting weighting factors to be applied to the results of such classifiers, with the weighted combination of the output of the multiple classifiers providing the resulting object identification.

20 Claims, 4 Drawing Sheets

(56) References Cited

U.S. PATENT DOCUMENTS

| | | | |
|---|---|---|---|
| 8,488,877 | B1 | 7/2013 | Owechko et al. |
| 8,553,989 | B1 | 10/2013 | Owechko et al. |
| 8,620,842 | B1* | 12/2013 | Cormack ............... 706/12 |
| 2005/0220336 | A1* | 10/2005 | Sabe ............ G06K 9/00248 |
| | | | 382/159 |
| 2006/0120609 | A1* | 6/2006 | Ivanov et al. ............ 382/224 |
| 2006/0269135 | A1 | 11/2006 | Ramsay et al. |
| 2008/0063265 | A1* | 3/2008 | Sathyanarayana ........ 382/159 |
| 2008/0167814 | A1* | 7/2008 | Samarasekera et al. ..... 701/213 |
| 2008/0177680 | A1* | 7/2008 | Laxman ............ G06K 9/6256 |
| | | | 706/12 |
| 2008/0294678 | A1 | 11/2008 | Gorman et al. |
| 2009/0157649 | A1* | 6/2009 | Papadakis et al. ............ 707/5 |
| 2010/0086218 | A1* | 4/2010 | Tateno ..................... 382/203 |
| 2010/0235406 | A1 | 9/2010 | Williams et al. |
| 2011/0118938 | A1 | 5/2011 | MacDonald et al. |
| 2012/0170805 | A1 | 7/2012 | Brown et al. |
| 2013/0076865 | A1* | 3/2013 | Tateno et al. ............... 348/46 |
| 2013/0177235 | A1* | 7/2013 | Meier ..................... 382/154 |
| 2013/0271577 | A1* | 10/2013 | Watanabe et al. ............ 348/46 |
| 2014/0222425 | A1* | 8/2014 | Park et al. ................. 704/243 |

OTHER PUBLICATIONS

Belkacem-Boussaid, et al., "Extraction of Color Features in the Spectral Domain to Recognize Centroblasts in Histopathology", In Annual International Conference of Engineering in Medicine and Biology Society, Sep. 3, 2009, 6 pages.

Sommer, et al., "Machine learning in cell biology—teaching computers to recognize phenotypes", In Journal of Cell Science, Nov. 20, 2013, 17 pages.

Guo, et al., "Semantic Feature Selection for Object Discovery in High-Resolution Remote Sensing Imagery", In Proceedings of the 11th Pacific-Asia conference on Advances in knowledge discovery and data mining, May 22, 2007, pp. 71-83.

Dollar, et al., "Integral Channel Features", In Proceedings of British Machine Vision Conference, Sep. 7, 2009, pp. 1-11.

* cited by examiner

OBJECT DETECTION UTILIZING GEOMETRIC INFORMATION FUSED WITH IMAGE DATA

BACKGROUND

An increasing amount of data regarding the physical world is being captured by automated and semi-automated mechanisms. For example, specially designed motor vehicles are utilized to drive along roads and capture data, such as in the form of images, of the surrounding physical world. As another example, aircraft are, likewise, utilized to capture data of the physical world they fly over. Because of the sheer quantity of data that can be captured, automated data analysis can be utilized to extract useful information from such data. One form of such useful information can be the identification of objects in a physical scene. Such objects can include humans, cars, buildings, signs, or portions thereof. For example, in a mapping context, it can be useful to automatically identify street signs, because such street signs can be utilized to verify the correctness of the digital map. As another example, it can be useful to identify humans in photographs before making such photographs public in order to be able to blur the faces of such humans, or to perform other image modification to protect the privacy of such humans.

Traditionally, the automated detection of objects in images required a two-step process. In a first step, the image data was analyzed to identify those portions of the image that were believed to be a representation of physical objects from the physical scene depicted in the image. In a second step, additional information in the form of geometric data would be utilized to double check and remove false positives from the identification of objects in the first step. The second step could not add back in objects that were not initially identified the first step. Furthermore, the second step could introduce further inaccuracies by, for example, incorrectly removing objects that were correctly identified by the first step, or incorrectly leaving in identifications from the first step that were not correct and did not identify an actual, physical object from the physical scene depicted in the image.

SUMMARY

Two-dimensional and three-dimensional data of a physical scene can be combined and analyzed together for purposes of identifying physical objects physically present in the physical scene. Two-dimensional data of a physical scene can comprise digital images depicting the physical scene, while three-dimensional data of the physical scene can comprise lidar measurements, or other like data providing physical information in three dimensions. The two-dimensional data can be analyzed to identify and generate image features, including edge strengths, color distributions, histograms of gradients, and other like image features. Similarly, three-dimensional data can be analyzed to identify and generate geometric features including length, width, height, velocity, object normals, three-dimensional entropy, density of points within a volume, and other like geometric features. The image features and geometric features can then be combined with one another such that corresponding image features are associated with corresponding geometric features. Automated object detection mechanisms can then be directed to the combination of image and geographic features and can consider them together in identifying physical objects from the physical scene. Such automated object detection mechanisms can utilize machine learning to identify optimal object detection mechanisms. One form of applicable machine learning can select and tune multiple classifiers, with each classifier identifying potential objects based on a specific set of image and geographic features, and the machine learning can further identify and adjust weighting factors to be applied to the results of such classifiers, with the weighted combination of the output of the multiple classifiers providing the resulting object identification.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the automated detection of physical objects, which are physically present in a physical scene, from two-dimensional and three-dimensional data obtained from such a physical scene. Two-dimensional data of a physical scene can comprise digital images depicting the physical scene, while three-dimensional data of the physical scene can comprise lidar measurements, or other like data providing physical information in three dimensions. The two-dimensional data can be analyzed to identify and generate image features, including edge strengths, color distributions, histograms of gradients, and other like image features. Similarly, three-dimensional data can be analyzed to identify and generate geometric features including length, width, height, velocity, object normals, three-dimensional entropy, density of points within a volume, and other like geometric features. The image features and geometric features can then be combined with one another such that corresponding image features are associated with corresponding geometric features. Automated object detection mechanisms can then be directed to the combination of image and geographic features and can consider them together in identifying physical objects from the physical scene. Such automated object detection mechanisms can utilize machine learning to identify optimal object detection mechanisms. One form of applicable machine learning can select and tune multiple classifiers, with each classifier identifying potential objects based on a specific set of image and geographic features, and the machine learning can further identify and adjust weighting factors to be applied to the results of such classifiers, with the weighted combination of the output of the multiple classifiers providing the resulting object identification.

The automated object detection techniques described herein are often utilized within the context of digital maps. More specifically, digital maps often include the ability to present digital images of an area surrounding a specified point on the digital map. Additionally, digital map accuracy can be improved through information obtained from digital images of a specific location. As to the former capability, the digital images of a surrounding area that can be provided as a feature of a digital map can include potential privacy-violating information, such as human faces, license plates, and the like. Automated object detection techniques can provide an efficient means by which such potential privacy-violating information within the digital images can be identified, thereby providing the opportunity to perform remedial measures such as obscuring it, or otherwise removing it. As to the latter capability, the digital images of an area can include representations of street signs, construction signs, commercial entity signs, and other like information that can be utilized to double check, update, or otherwise improve the accuracy of a digital map. Automated object detection mechanisms can provide an efficient means by which such signs can be automatically identified, parsed, and the information thereof provided in a manner facilitating appropriate updating of the digital map.

The mechanisms described, however, are not limited to digital mapping contexts. To the contrary, the described techniques are equally applicable to any detection of representations of physical objects within digital data captured of a physical scene. Consequently, references to specific utilizations and contexts are exemplary only and are not meant to limit the mechanisms described to only those environments.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
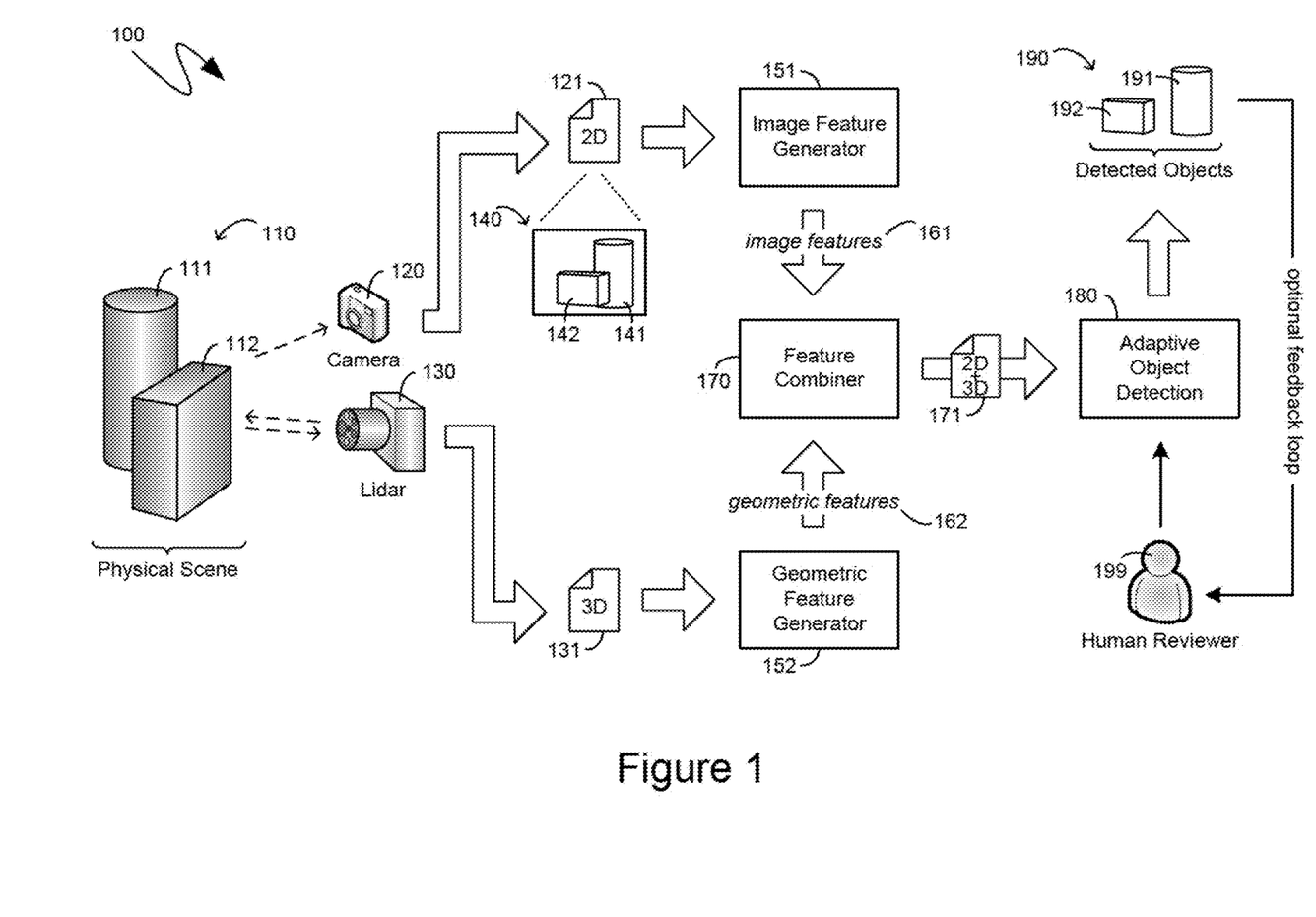
FIG. 1 is a block diagram of an exemplary system for automatically identifying objects in a physical scene through combined two-dimensional and three-dimensional data.

With reference to FIG. 1, an exemplary system 100 is shown, illustrating an automated detection of objects in accordance with one aspect. To provide reference for the mechanisms illustrated in FIG. 1, the exemplary system 100 includes a physical scene 110 comprising physical objects, such as the exemplary objects 111 and 112. As indicated previously, one common utilization for the mechanisms illustrated in FIG. 1, and described in detail below, is within a digital mapping context. In such a context, a physical scene, such as the physical scene 110, can comprise people, storefronts, vehicles on a road, trees, signs, buildings, and other like physical objects. Such a physical scene, in other words, can be that visible while driving along a road. The exemplary scene 110, however, can be any physical collection of objects in any environment.

To provide a basis for the object detection mechanisms described herein, the exemplary physical scene 110 can be documented in digital form through various means. For example, as illustrated by the exemplary system 100 of FIG. 1, a digital camera, such as the exemplary camera 120, can capture a two-dimensional digital representation of the exemplary physical scene 110. Most commonly, the two-dimensional data 121, captured by the exemplary digital camera 120, can be in the form of a digital image 140 comprising pixels of varying color and intensity in accordance with the light reflected off of the various objects of the exemplary physical scene 110 through the lens of the exemplary camera 120. For example, the exemplary digital image 140 comprises representations 141 and 142 of the exemplary physical objects 111 and 112, of the exemplary physical scene 110 that was captured by the exemplary digital camera 120. As utilized herein, the term "two-dimensional data" means data that represents a three-dimensional physical scene in only two physical dimensions. Such two physical dimensions are typically the width dimension and the height dimension, to the exclusion of a third physical dimension, namely the depth dimension. The term "two-dimensional data", therefore, does not mean that the data itself has only two dimensions. To the contrary, image data is often expressed and stored within the context of color spaces that are defined utilizing three or more dimensions of color data.

In addition to the two-dimensional data 121, another mechanism for documenting the exemplary physical scene 110 can be mechanisms that capture a three-dimensional digital representation of the exemplary physical scene 110. For example, the exemplary system 100 of FIG. 1 illustrates a lidar device, such as the exemplary lidar device 130, which can generate optical signals, such as laser shots, that are emitted from the exemplary lidar device 130 to the various physical objects in the exemplary physical scene 110, and then bounce off of such physical objects and return back to the exemplary lidar device 130, thereby enabling the generation of digital data capturing three-dimensional information about the exemplary physical scene 110. As utilized herein, the term "three-dimensional data" means data that represents a three-dimensional physical scene in all three physical dimensions, namely the width dimension, the height dimension and the depth dimension. Like the term "two-dimensional data", as utilized herein and as detailed above, the term "three-dimensional data" also does not refer to the dimensionality of the data itself.

According to one aspect, the three-dimensional data 131 can be combined with the two-dimensional data 121 prior to analysis by automated object detection mechanisms, thereby enabling such object detection mechanisms to consider both two-dimensional and three-dimensional data coincidentally with one another. Prior to such a combination, the two-dimensional data 121 can be provided to an image feature generator 151, which can generate image features 161 from the two-dimensional data 121. The generated image features 161 can comprise identifications of specific aspects or portions of the two-dimensional data 121, metadata or other like derivative data that was derived from the two-dimensional data 121, and combinations thereof. For example, the image feature generator 151 can analyze the two-dimensional data 121 and can generate information regarding the strength of the edges between areas of different color or intensity within the two-dimensional data 121. Such edge strengths can be one of the image features 161 generated by the image feature generator 151. Another example of one of the image features 161, which can be generated by the image feature generator 151, can be color distributions, which can comprise identifications of areas, within the two-dimensional data 121, having similar color or intensity, having a uniform color distribution, or otherwise being visually connected. Such areas can be delineated by regions of color discontinuity, or the aforementioned edges.

The image features 161, which the image feature generator 151 can generate, can include image features directed to the detection of edges within two-dimensional image data, including, for example, image features identified using a Canny edge detector, a differential gradient based edge detector, a Sobel filter, or a Roberts cross operator. The image features 161 can further include image features directed to the detection of corners within two-dimensional image data, including, for example, image features identified using the Moravec corner detection algorithm, the Harris and Stephens corner detection algorithm, or variants thereof, or the Wang and Brady corner detection algorithm. The image features 161 can also include image features directed to the detection of blobs, or regions within the two-dimensional image data that differ in or more properties from the surrounding regions, including, for example, image features identified using the Laplacian of a Gaussian transformation, the difference between two Gaussian transformations, or differential blob detectors.

In a manner analogous to the image feature generator 151 described in detail above, a geometric feature generator 152 can generate geometric features 162 from the three-dimensional data 131. More specifically, the geometric feature generator 152 can identify specific aspects or portions of the three-dimensional data 131, metadata or other like derivative data that was derived from the three-dimensional data 131, and combinations thereof. According to one aspect, the geometric feature generator 152 can generate geometric features 162 providing information regarding a length, a width, a height, or combinations thereof. For example, laser shots from the exemplary lidar device 130 can bounce off of the physical object 112, in the exemplary physical scene 110, and can return to the exemplary lidar device 130. In such a manner, the exemplary lidar device 130 can derive a distance between the exemplary lidar device 130 and the physical object 112. Furthermore, with information on the firing positions where the laser shots are fired and the attitude information of the laser, the exemplary lidar device 130 can determine three-dimensional data 131 on the physical object 112. Once the three-dimensional data 131 are acquired, the data can be segmented to derive component information such that a width, a depth and a height of the physical object 112 can be determined. Such a width, a depth and a height can be some of the geometric features 162 generated by the geometric feature generator 152, which can receive the three-dimensional data 131 as input and can then apply the aforementioned trigonometric functions to generate such a height of one object in the physical scene described by the three-dimensional data 131. Other similar heights, widths, depths and other physical dimensions can, likewise, be generated, by the geometric feature generator 152, for one or more other physical entities in the physical scene described by the three-dimensional data 131.

In addition to deriving the length, width and height, or combinations thereof, of a physical entity in the physical scene described by the three-dimensional data 131, geometric feature generator 152 can further derive geometric features 162 that can include the velocity of an object or, more specifically, the velocity of individual points captured by the exemplary lidar device 130. Similarly, the geometric features 162, generated by the geometric feature generator 152, can include normals, or other vectors extending from a plane defined by three or more points in physical space detected by the exemplary lidar device 130. Other derivative data can, likewise, be part of the geometric features 162. For example, the geometric features 162 can include the three-dimensional entropy derived from the three-dimensional data 131, such as by the geometric feature generator 152. As another example, the geometric features 162 can include the density of points in a volume, or defined three-dimensional area, as detailed in the three-dimensional data 131.

The image features 161, generated by the image feature generator 151, and the geometric features 162, generated by the geometric feature generator 152, can both be provided to a feature combiner component 170, which can generate a combined set of two-dimensional and corresponding three-dimensional features, such as in the form of the combined two-dimensional and three-dimensional feature data 171. According to one aspect, the feature combiner component 170 can correlate specific ones of the image features 161 with specific ones of the geometric features 162. For example, one of the image features 161, such as detailed above, can be color distribution information that can indicate that a particular area exhibits a uniform color distribution. One of the geometric features 162, in such an example, can be height and width information corresponding to the same area exhibiting the uniform color distribution. The feature combiner component 170 can correlate such an image feature with such a geometric feature in order to generate the combined two-dimensional and three-dimensional feature data 171. Such a correlation can be based on an alignment between the physical scene 110, as captured by the camera 120, for example, and the physical scene 110, as captured by the lidar device 130. Thus, for example, the feature combiner component 170 can annotate various ones of the image features 161 with corresponding geometric features 162, such as derived physical measurements, estimated velocity, and other like geometric features 162, that were described in detail above. As another example, the feature combiner component 170 can associate specific portions of the two-dimensional data 121, such as specific pixel ranges, with one or more of the geometric features 162 including, for example, the three-dimensional entropy associated with an area of the physical scene 110 depicted within those specific pixel ranges, an estimated velocity of points corresponding to specific pixels or pixel ranges, and other like associations.

The feature combiner component 170 can provide the combined two-dimensional and three-dimensional feature data 171 to an adaptive object detection system 180, which can utilize the combined two-dimensional and three-dimensional feature data 171 to detect objects 190, such as the exemplary detected objects 191 and 192, which can correspond to physical objects, such as the physical objects 111 and 112, respectively, from the physical scene 110 represented by the combined two-dimensional and three-dimensional feature data 171. According to one aspect, the adaptive object detection system 180 can utilize machine learning to tune its object detection capabilities. Additionally, as illustrated by the exemplary system 100 of FIG. 1, an optional feedback loop can be provided by a human reviewer 199, who can apply human intelligence to verify that the detected objects 190 correspond to actual, physical objects, and, if not, to appropriately notify the adaptive object detection system 180, thereby providing further feedback and enabling the adaptive object detection system 180 to further tune itself to enable more accurate object detection.

Figure 2:
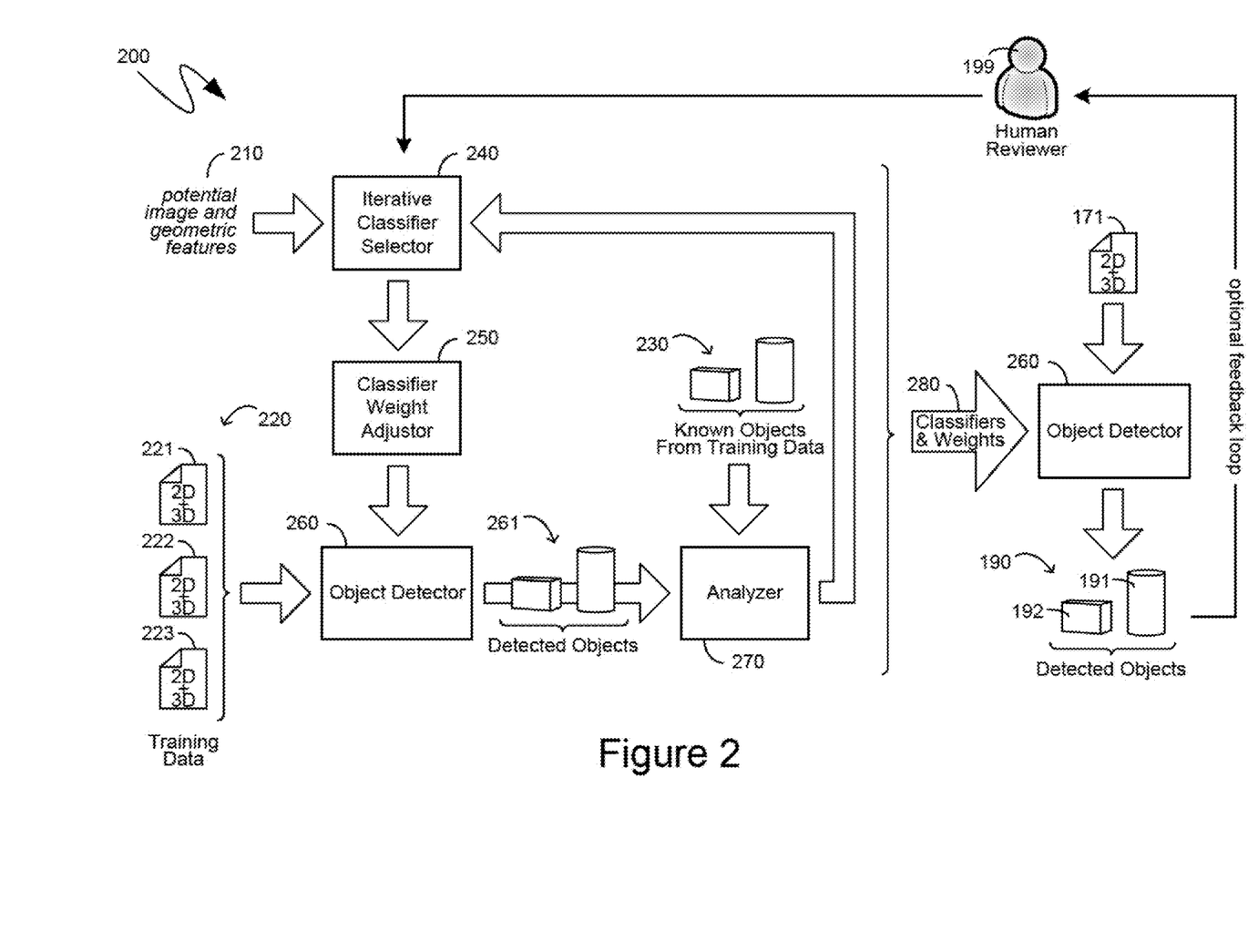
FIG. 2 is a block diagram of an exemplary system utilizing machine learning to automatically identify objects in a physical scene through combined two-dimensional and three-dimensional data.

Turning to FIG. 2, the exemplary system 200 shown therein illustrates one exemplary operation of an adaptive object detection system utilizing combined two-dimensional and three-dimensional feature data, such as the exemplary adaptive object detection system 180 illustrated in FIG. 1. In the exemplary system 200, objects can be detected by an object detector component 260 that can utilize a combination of multiple discrete classifiers, each of which can detect objects based on a defined set of one or more criteria. The multiple discrete classifiers can be weighted, and the object detector 260 can detect objects based upon a weighted amalgamation of the results of each individual discrete classifier.

Initially, the object detector 260 can be trained through the use of training data 220, which can comprise multiple combined two-dimensional and three-dimensional feature data sets, such is the exemplary combined two-dimensional and three-dimensional feature data sets 221, 222 and 223. Additionally, known objects 230 for each of such combined two-dimensional and three-dimensional feature data sets 221, 222 and 223 can have been predetermined, and can be utilized to train the object detector 260. According to one aspect, an iterative classifier selector 240 can initially select a classifier that identifies objects in a combined two-dimensional and three-dimensional feature data based upon one or more image features or geometric features 210. The image features and geometric features on which classifiers selected by the iterative classifier selector 240 can base their object detection can be predetermined, as illustrated by the potential image features and geometric features 210 being provided to the iterative classifier selector 240. More specifically, each individual classifier can comprise computer-executable instructions which, when executed, evaluate combined two-dimensional and three-dimensional feature data, select therefrom specific image features or geographic features, and output one or more potential objects identified based on such image features or geographic features. The iterative classifier selector 240 can select a classifier based on the output of an analyzer component 270, whose operation will be detailed further below.

The classifier selected by the iterative classifier selector 240 can be assigned a weight by the classifier weight adjuster 250. Initially, each classifier can be assigned a default weight of "one", with subsequent adjustments to the weight, performed by the classifier weight adjuster 250, being based on the output of the analyzer 270.

By way of a simple example, the iterative classifier selector 240 can select a classifier that detects specific types of objects such as, for example, humans, by determining that anything having a height of between four-and-one-half and six-and-one-half feet is a human. Such a simple classifier, therefore, utilizes only a single geometric feature upon which to detect humans, namely the geometric feature of height. The classifier selected by the iterative classifier selector 240 can initially be assigned a weight of one, by the classifier weight adjuster 250, and the object detector 260 can utilize one of the training data 220 to detect objects 261 in accordance with the classifier selected by the iterative classifier 240. For purposes of continuing with the present, simple example, the object detector 260, using the simple classifier exemplary described above, can generate detected objects 261 that identify multiple humans within the physical scene represented by one of the training data 220 provided to the object detector 260. The analyzer 270 can compare the detected objects 261 to known objects 230 and can determine, for example, that the object detector 260 did not properly detect objects within the physical scene that was represented by the one of the training data utilized. Such feedback, from the analyzer 270, can then be provided to the iterative classifier selector 240 and, therefrom, the iterative classifier selector 240 can select another classifier. More specifically, the iterative classifier selector 240 can select another classifier to ameliorate the discrepancy between the detected objects 261, that were detected utilizing a currently selected set of classifiers, and the known objects 230, such discrepancy having been determined by the analyzer 270.

For purposes of continuing with the present, simple example, the iterative classifier selector 240 can select another classifier that identifies humans based on one or more image features, such as, for example, facial recognition features. The classifier weight adjuster 250 can adjust the weight assigned to the previously selected classifier, as well as assign an initial weight to the newly selected classifier. For example, the classifier weight adjuster 250 can decrease the weight assigned to the previously selected classifier to, for example, one half, and can assign an initial weight of one to the newly selected classifier. The object detector 260 can then, again, utilize one of the training data 220 and can detect objects in such training data based upon the combination of classifiers selected by the iterative classifier selector 240, weighted with the weights assigned to them by the classifier weight adjuster 250. The resulting detected objects 261 can, again, be compared with known objects 230, such as by the analyzer 270, and the output thereof can be provided to the iterative classifier selector 240. In each iteration, as can be seen, the iterative classifier selector 240, and the classifier weight adjuster 250, can select classifiers, and assign weights, to enable the object detector 260 to utilize the combination of classifiers and associated weights to accurately detect objects. Such classifiers and weights 280 can then be utilized, by the object detector 260, to detect objects in two-dimensional and three-dimensional feature data, such as the exemplary two-dimensional and three-dimensional feature data 171 originally illustrated in FIG. 1, and now shown in the exemplary system 200 of FIG. 2 to represent the steady-state operation of the object detector 260 after training.

To complete the above, simple example, and provide context regarding the classifiers and weights 280 that are tuned utilizing the training described in detail above, the first classifier detailed in the simple example above, detecting humans based only on height, can have correctly identified a human in the physical scene represented by the two-dimensional and three-dimensional feature data that was used as training data, but it can also have identified as a human a five foot tall tree sapling in the physical scene.

Conversely, the second classifier detailed in the simple example above can have also correctly identified the human in the physical scene represented by the two-dimensional and three-dimensional feature data that was used as training data, but it can also have identified as a human an image from a billboard. As can be seen, the second classifier correctly avoided classifying the tree sampling as a human, and the first classifier correctly avoided classifying the billboard as a human. If each classifier was, for purposes of the present example, weighted with a weight of one-half, the object detector 260, utilizing only such two classifiers, with such assigned weights, can have weighted the identification, as a human, of both the human and the tree sampling with a weight of one half utilizing the first classifier, and can have weighted the identification, as a human, of both the human and the billboard with a weight of one half utilizing the second classifier. Summing the output of such classifiers, the identification of the human as a human can have a summed weight of one, while the others can remain at a summed weight of one half. Applying a threshold, the object detector 260 can then, correctly, identify the human in the physical scene represented by the scene represented by the two-dimensional and three-dimensional feature data that was used as training data, while correctly disregarding both the tree sampling and the billboard.

Although the training can be a discrete step, with the resultant classifiers and weights 280 being sent and then utilized by the object detector 260 during steady-state operation, an optional feedback loop through a human reviewer 199, such as that illustrated by the exemplary system 200 of FIG. 2, can also be utilized. More specifically, a human reviewer, such as exemplary human reviewer 199, can, occasionally, compare the detected objects 192 that such a human reviewer 199 knows to be in the physical scene represented by the two-dimensional and three-dimensional feature data 171. Such feedback can then be provided to the iterative classifier selector 240, and the classifier weight adjuster 250, to further refine the classifiers and weights 280 utilized by the object detector 260.

Although not specifically illustrated, other machine learning algorithms and mechanisms can likewise be utilized to train an object detector to detect objects based upon a combination of two-dimensional and three-dimensional feature data, thereby enabling such an object detector to consider two-dimensional feature data coincidentally with three-dimensional feature data.

Figure 3:
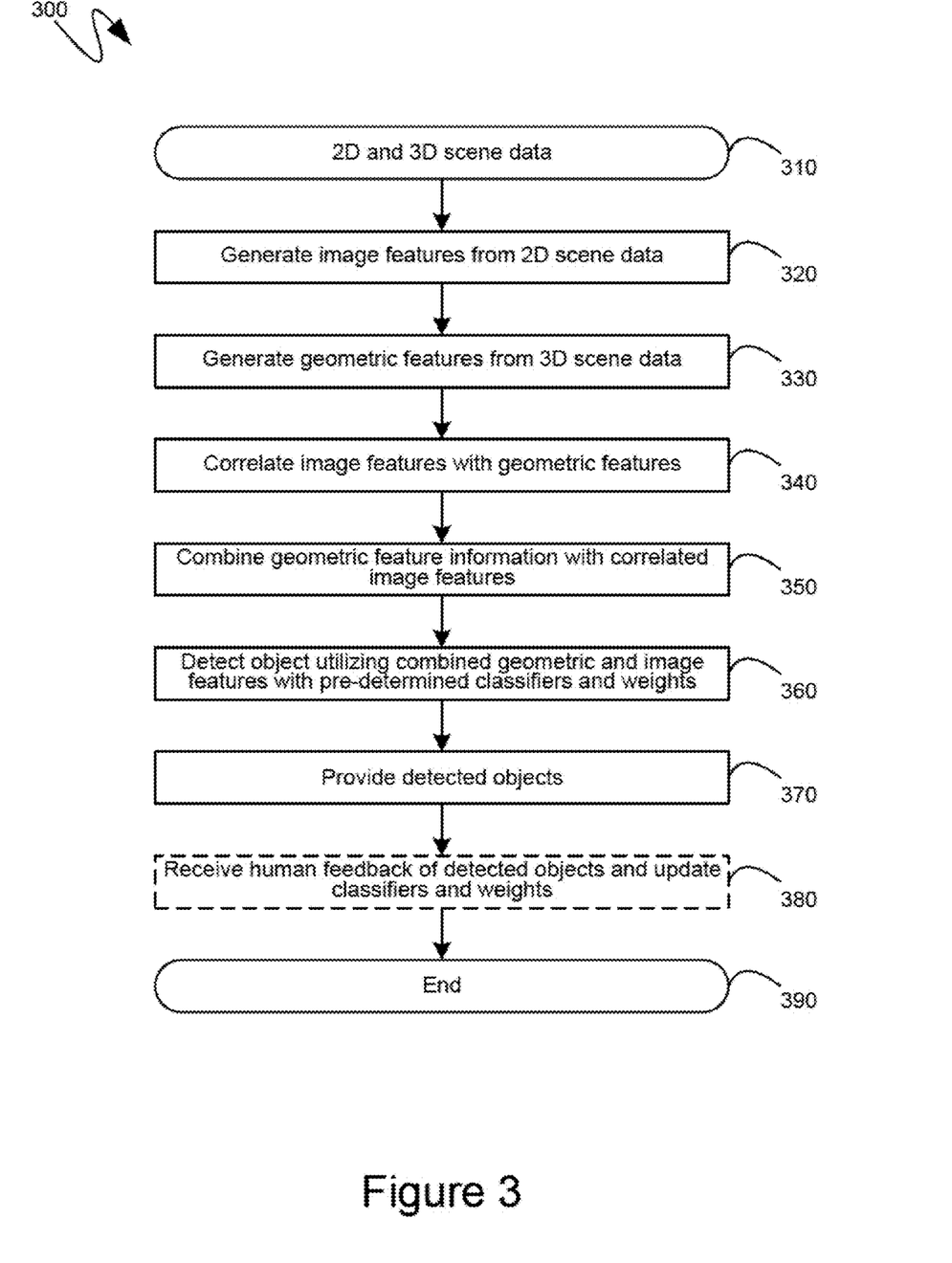
FIG. 3 is a flow diagram of an exemplary automated identification of objects in a physical scene through combined two-dimensional and three-dimensional data.

Turning to FIG. 3, the exemplary flow diagram 300 shown therein illustrates an exemplary series of steps by which two-dimensional features and three-dimensional features can be considered coincidentally with one another by automated object detection mechanisms that seek to identify representations of physical objects in two-dimensional and three-dimensional data collected from a physical scene comprising such physical objects. Initially, at step 310, two-dimensional and three-dimensional data from a physical scene can be received. As indicated previously, two-dimensional data can typically be in the form of an image or other like two-dimensional representation of a physical, three-dimensional scene. The three-dimensional data, as also previously described, can be captured by devices that can quantify measurements of the physical scene in all three dimensions. Subsequently, at steps 320 and 330, image features can be generated or extracted from the two-dimensional scene data, and geometric features can be generated or extracted from the three-dimensional scene data, respectively. While illustrated as discrete steps that occur in linear fashion, those of skill in the art will recognize that steps 320 and 330 can also be performed in parallel, either as discrete steps, or as a single step, and their illustration as successive steps, in the exemplary flow diagram 300 of FIG. 3, is strictly for ease of illustration and simplicity of presentation.

At step 340, at least some of the image features generated at step 320, and at least some of the geometric features generated at step 330 can be correlated, or otherwise associated with one another. At step 340, it may be possible for a one-to-one correspondence to exist between image features and geometric features such as, for example, the geometric feature of estimated velocity corresponding to a particular set of points that have an identified image feature in the form of uniform color distribution. However, step 340 can also correlate image features with geometric features in a many-to-one or many-to-many relationship. For example, multiple geometric features, such as length, width, height, three-dimensional entropy and density of points can all be associated with a single image feature, such as a single area of uniform color distribution. As another example, an area of uniform color distribution, bounded by edges having a particular strength, can be indicated by at least those two image features, and can be associated with, correlated with, multiple geometric features, such as those enumerated in the example above. At step 350, geometric feature information can be combined with image feature information. Such a combination can utilize the correlations identified at step 340, for example identifying an area of uniform color distribution as having a specific estimated velocity. Such a combination can also associate, or group, image features and geometric features based on their relative locations within the two-dimensional and three-dimensional scene data received at step 310. As yet another example, the combination, at step 350, can simply amalgamate image features and geometric features that are otherwise uncategorized.

Processing can then proceed to step 360, where representations of physical objects in the two-dimensional and three-dimensional scene data received at step 310, can be detected utilizing the combined geometric and image features. As described in detail above, step 360 can utilize machine learning to tune the detection of objects in the two-dimensional and three-dimensional scene data. By considering two-dimensional information coincidentally with three-dimensional information, the object detection, at step 360, can avoid the need for subsequent filtering or double-checks, as would be the case if object detection was based on only one type of data, while another type of data was utilized only for subsequent filtering or double-checks. The object detection performed at step 360 can be tuned through the utilization of training data, such as described in detail above. Since such training can occur prior to a steady-state operation, it is not specifically illustrated in the exemplary flow diagram 300 of FIG. 3. The objects detected at step 360 can then be output at step 370. As an optional step, human feedback of the objects output at step 370, can be received at step 380, and the mechanisms utilized, at step 360, to detect objects can be appropriately updated to take into account such feedback. As indicated previously, such human feedback can be an optional step and, consequently, is illustrated in FIG. 3 utilizing dashed lines. The relevant processing to then end at step 390.

Figure 4:
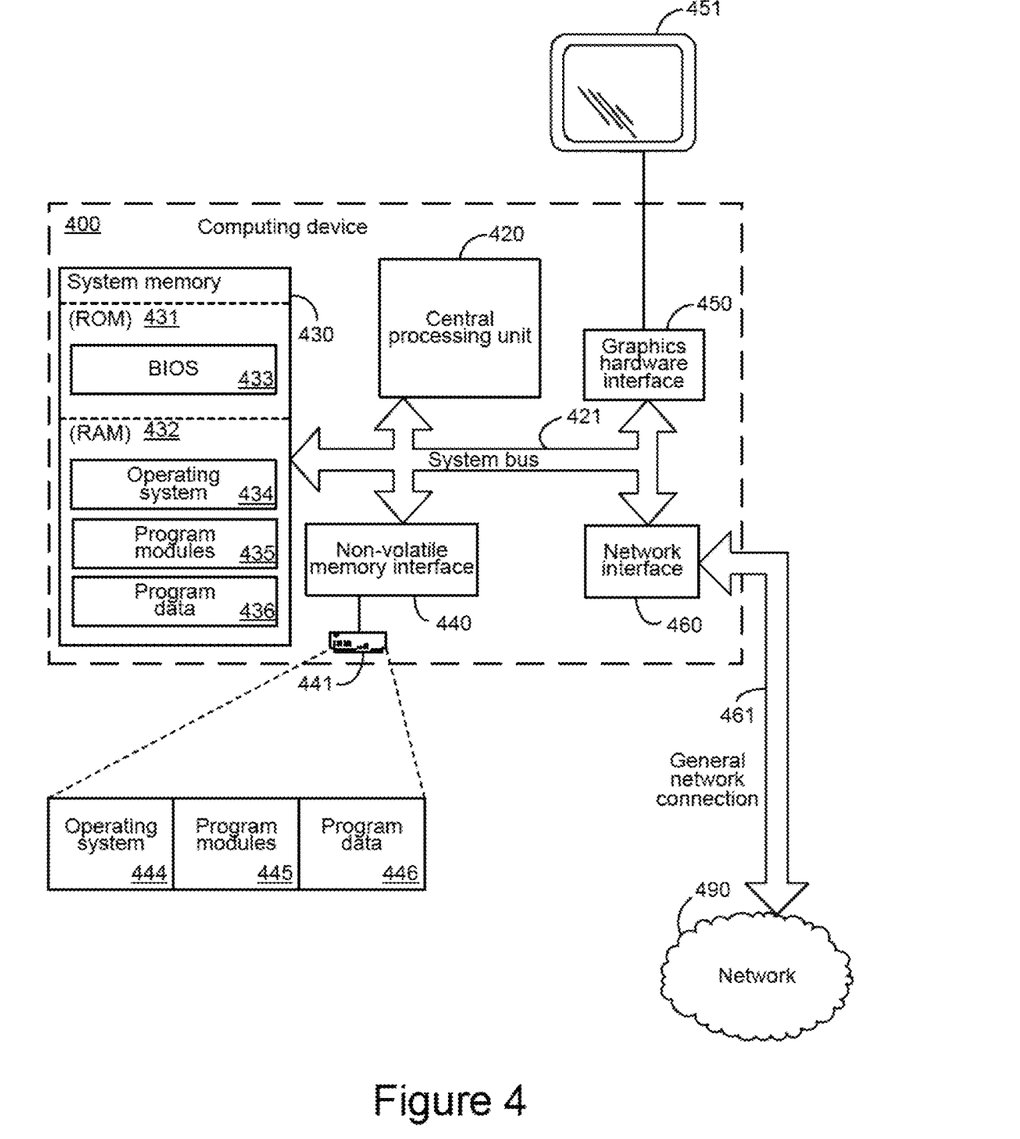
FIG. 4 is a block diagram of an exemplary computing device.

Turning to FIG. 4, an exemplary computing device 400 is illustrated which can perform some or all of the mechanisms and actions described above. The exemplary computing device 400 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, including, but not limited to, a graphics hardware interface 450 and a display device 451, which can include display devices capable of receiving touch-based user input, such as a touch-sensitive, or multi-touch capable, display device. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-volatile memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 may operate in a networked environment using logical connections to one or more remote computers. The computing device 400 is illustrated as being connected to the general network connection 461 through a network interface or adapter 460, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 461. It will be appreciated that the network connections shown are exemplary and other means of establishing a communications link between computing devices may be used.

Although described as a single physical device, the exemplary computing device 400 can be a virtual computing device, in which case the functionality of the above-described physical components, such as the CPU 420, the system memory 430, the network interface 460, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device for detecting representations of physical objects in an image of a physical scene comprising the physical objects, the computing device comprising one or more processing units and computer-readable media comprising computer-executable instructions that, when executed by the processing units, cause the computing device to perform steps comprising: generating image features from two-dimensional image data obtained from the physical scene; generating geometric features from three-dimensional data obtained from the physical scene; identifying correspondences between the generated image features and the generated geometric features; combining the generated geometric features and the generated image features, the combining being in accordance with the identified correspondences between the generated image features and the generated geometric features; and detecting the representations of the physical objects in the image by coincidentally considering both the generated image features and the generated geometric features.

A second example is the computing device of the first example, wherein the generated image features comprise at least one of: edge strengths, color distributions or histogram of gradients.

A third example is the computing device of the first example, wherein the generated geometric features comprise an estimated velocity of a portion of the physical scene.

A fourth example is the computing device of the first example, wherein the generated image features comprise at least one of: a normal of a portion of the physical scene, a density of points in a volume of the physical scene, or a three-dimensional entropy of a portion of the physical scene.

A fifth example is the computing device of the first example, wherein the detecting is performed by machine-learning algorithms.

A sixth example is the computing device of the fifth example, wherein the computer-executable instructions causing the computing device to perform the detecting comprise computer-executable instructions that, when executed by the processing units, cause the computing device to perform further steps comprising: utilizing a first classifier to identify a first one or more potential representations of the physical objects based upon a first defined subset of the generated image features and the generated geometric features; generating a weighted first one or more potential representations of the physical objects by applying a first weighting to the first one or more potential representations of the physical objects identified by the first classifier; utilizing a second classifier, differing from the first classifier, to identify a second one or more potential representations of the physical objects based upon a second defined subset of the generated image features and the generated geometric features; generating a weighted second one or more potential representations of the physical objects by applying a second weighting to the second one or more potential representations of the physical objects identified by the second classifier; amalgamating the weighted first one or more potential representations of the physical objects and the weighted second one or more potential representations of the physical objects; and detecting the representations of the physical objects in the image based on the amalgamation.

A seventh example is the computing device of the fifth example, comprising further computer-executable instructions for training the machine-learning algorithms, the further computer-executable instructions, when executed by the processing units, cause the computing device to perform further steps comprising: selecting a classifier, the classifier identifying one or more potential representations of the physical objects based upon a defined subset of the generated image features and the generated geometric features; assigning a weight to the selected classifier; detecting representations of physical objects in a training image utilizing the selected classifier and the assigned weight; comparing the detected representations of the physical objects in the training image to known representations of the physical objects in the training image; and utilizing the comparing to inform the selecting and the assigning for a subsequent classifier.

An eighth example is the computing device of the fifth example, comprising further computer-executable instructions that, when executed by the processing units, cause the computing device to perform further steps comprising: receiving human-generated feedback regarding an accuracy of the detecting; and tuning the machine-learning algorithms in accordance with the received feedback.

A ninth example is a system for automatically detecting representations of physical objects in an image of a physical scene comprising the physical objects, the system comprising: a digital camera capturing two-dimensional data from the physical scene, the two-dimensional data being in the form of the image of the physical scene; a lidar device capturing three-dimensional data from the physical scene; and a computing device comprising one or more processing units and computer-readable media comprising computer-executable instructions that, when executed by the processing units, cause the computing device to perform steps comprising: combining the two-dimensional data and the three-dimensional data; and detecting the representations of the physical objects in the image by coincidentally considering both the two-dimensional data and the three-dimensional data.

A tenth example is the system of the ninth example, wherein the computing device comprises further computer-executable instructions that, when executed by the processing units, cause the computing device to perform steps comprising: generating image features from the two-dimensional data; generating geometric features from the three-dimensional data; and identifying correspondences between the generated image features and the generated geometric features; wherein the combining the two-dimensional data and the three-dimensional data comprises combining the generated geometric features and the generated image features, the combining being in accordance with the identified correspondences between the generated image features and the generated geometric features; and wherein further the detecting is performed by coincidentally considering both the generated image features and the generated geometric features.

An eleventh example is the system of the tenth example, wherein the generated geometric features comprise an estimated velocity of a portion of the physical scene.

A twelfth example is the system of the ninth example, wherein the detecting is performed by machine-learning algorithms.

A thirteenth example is the system of the twelfth example, wherein the computing device comprises further computer-executable instructions that, when executed by the processing units, cause the computing device to perform steps comprising: generating image features from two-dimensional image data obtained from the physical scene; and generating geometric features from three-dimensional data obtained from the physical scene; and wherein further the computer-executable instructions causing the computing device to perform the detecting comprise computer-executable instructions that, when executed by the processing units, cause the computing device to perform further steps comprising: utilizing a first classifier to identify a first one or more potential representations of the physical objects based upon a first defined subset of the generated image features and the generated geometric features; generating a weighted first one or more potential representations of the physical objects by applying a first weighting to the first one or more potential representations of the physical objects identified by the first classifier; utilizing a second classifier, differing from the first classifier, to identify a second one or more potential representations of the physical objects based upon a second defined subset of the generated image features and the generated geometric features; generating a weighted second one or more potential representations of the physical objects by applying a second weighting to the second one or more potential representations of the physical objects identified by the second classifier; amalgamating the weighted first one or more potential representations of the physical objects and the weighted second one or more potential representations of the physical objects; and detecting the representations of the physical objects in the image based on the amalgamation.

A fourteenth example is the system of the twelfth example, wherein the computing device comprises further computer-executable instructions that, when executed by the processing units, cause the computing device to perform further steps comprising: generating image features from two-dimensional image data obtained from the physical scene; generating geometric features from three-dimensional data obtained from the physical scene; selecting a classifier, the classifier identifying one or more potential representations of the physical objects based upon a defined subset of the generated image features and the generated geometric features; assigning a weight to the selected classifier; detecting representations of physical objects in a training image utilizing the selected classifier and the assigned weight; comparing the detected representations of the physical objects in the training image to known representations of the physical objects in the training image; and utilizing the comparing to inform the selecting and the assigning for a subsequent classifier.

A fifteenth example is a method for detecting representations of physical objects in an image of a physical scene comprising the physical objects, the method comprising the steps of: generating image features from two-dimensional image data obtained from the physical scene; generating geometric features from three-dimensional data obtained from the physical scene; identifying correspondences between the generated image features and the generated geometric features; combining the generated geometric features and the generated image features, the combining being in accordance with the identified correspondences between the generated image features and the generated geometric features; and detecting the representations of the physical objects in the image by coincidentally considering both the generated image features and the generated geometric features.

A sixteenth example is the method of the fifteenth example, wherein the generated geometric features comprise an estimated velocity of a portion of the physical scene.

A seventeenth example is the method of the fifteenth example, wherein the detecting is performed by machine-learning algorithms.

An eighteenth example is the method of the seventeenth example, wherein the detecting comprises the steps of: utilizing a first classifier to identify a first one or more potential representations of the physical objects based upon a first defined subset of the generated image features and the generated geometric features; generating a weighted first one or more potential representations of the physical objects by applying a first weighting to the first one or more potential representations of the physical objects identified by the first classifier; utilizing a second classifier, differing from the first classifier, to identify a second one or more potential representations of the physical objects based upon a second defined subset of the generated image features and the generated geometric features; generating a weighted second one or more potential representations of the physical objects by applying a second weighting to the second one or more potential representations of the physical objects identified by the second classifier; amalgamating the weighted first one or more potential representations of the physical objects and the weighted second one or more potential representations of the physical objects; and detecting the representations of the physical objects in the image based on the amalgamation.

A nineteenth example is the method of the seventeenth example, further comprising further steps for training the machine-learning algorithms, the further steps comprising: selecting a classifier, the classifier identifying one or more potential representations of the physical objects based upon a defined subset of the generated image features and the generated geometric features; assigning a weight to the selected classifier; detecting representations of physical objects in a training image utilizing the selected classifier and the assigned weight; comparing the detected representations of the physical objects in the training image to known representations of the physical objects in the training image; and utilizing the comparing to inform the selecting and the assigning for a subsequent classifier.

And a twentieth example is the method of the seventeenth example, further comprising the steps of: receiving human-generated feedback regarding an accuracy of the detecting; and tuning the machine-learning algorithms in accordance with the received feedback.

As can be seen from the above descriptions, mechanisms for detecting objects by coincidentally considering both two-dimensional and three-dimensional data have been presented. In view of the many possible variations of the subject matter described herein, we claim as our invention all such embodiments as may come within the scope of the following claims and equivalents thereto.

We claim:
1. A computing device for automatically identifying portions of an image of a physical scene as depicting physical objects of predefined types in the physical scene, the computing device comprising:
   one or more processing units; and
   computer-readable media comprising computer-executable instructions, which, when executed by the one or more processing units, cause the computing device to:
      generate a set of image features from two-dimensional image data that was obtained by two-dimensionally imaging the physical scene;
      generate a set of geometric features from three-dimensional image data that was obtained by three-dimensionally measuring the physical scene coincidentally with the two-dimensional imaging of the physical scene;
      generate correspondences between image features in the generated set of image features and geometric features in the generated set of geometric features;
      identify, based on a first subset of the image features, a first portion of the image of the physical scene as depicting a physical object of a first predefined type;
      select a first subset of the geometric features that corresponds to the first subset of the image features based on the generated correspondences; and
      determine, based on the first subset of the geometric features, that the identified first portion of the image does not actually depict a physical object of the first predefined type.

2. The computing device of claim 1, wherein the computer-executable instructions that cause the computing device to determine, based on the first subset of the geometric features, that the identified first portion of the image does not actually depict a physical object of the first predefined type comprise computer-executable instructions, which, when executed by the one or more processing units, cause the computing device to:
  determine, based on the first subset of the geometric features, that the identified first portion of the image depicts a physical object whose physical size, physical shape or physical location are inconsistent with physical objects of the first predefined type.

3. The computing device of claim 1, wherein the computer-executable instructions causing the computing device to perform the identifying, the selecting, and the determining, are part of a first classifier that generates a first classifier output identifying a first set of portions of the image as depicting physical objects of the first predefined type; and wherein further the computer-readable media comprise further computer-executable instructions, which, when executed by the one or more processing units, cause the computing device to:
  assign a first weight to the first classifier output to generate a weighted first classifier output;
  receive, from a second classifier, a second classifier output that identifies a second set of portions of the image as depicting physical objects of the first predefined type;
  assign a second weight to the second classifier output to generate a weighted second classifier output; and
  amalgamate the weighted first classifier output with the weighted second classifier output;
  wherein the automatically identifying the portions of the image of the physical scene as depicting the physical objects of the predefined types is based on the amalgamating.

4. The computing device of claim 3, wherein the computer-readable media comprise further computer-executable instructions, which, when executed by the one or more processing units, cause the computing device to:
  identify, utilizing the first and second classifiers, with their outputs weighted by the first and second weights, respectively, portions of a training image as depicting the physical objects of the predefined types;
  compare the identified portions of the training image to known portions of the training image verified to depict the physical objects of the predefined types;
  modify the first and second weights;
  repeat the identifying the portions of the training image and the comparing utilizing the modified first and second weights; and
  select, as selected first and second weights, those of the modified first and second weights that resulted in the identified portions of the training image being closest to the known portions.

5. The computing device of claim 1, wherein the generated image features comprise at least one of: edge strengths, color distributions or histogram of gradients.

6. The computing device of claim 1, wherein the generated geometric features comprise an estimated velocity of a portion of the physical scene.

7. The computing device of claim 1, wherein the generated image features comprise at least one of: a normal of a portion of the physical scene, a density of points in a volume of the physical scene, or a three-dimensional entropy of a portion of the physical scene.

8. The computing device of claim 1, wherein the correspondences between images features and geometric features comprise correspondences between multiple different geometric features and a single image feature.

9. The computing device of claim 1, wherein the first predefined type of physical object is one of: street signs, automotive license plates, construction signs, and commercial entity signs.

10. A system for automatically identifying portions of an image of a physical scene as depicting physical objects of predefined types in the physical scene, the system comprising:
  a digital camera capturing two-dimensional data from the physical scene, the two-dimensional data being in the form of the image of the physical scene;
  a lidar device capturing three-dimensional data from the physical scene; and
  a computing device comprising:
    one or more processing units; and
    computer-readable media comprising computer-executable instructions, which, when executed by the one or more processing units, cause the computing device to:
    generate correspondences between subsets of the two-dimensional data and subsets of the three-dimensional data;
    identify, based on a first subset of the two-dimensional data, a first portion of the image of the physical scene as depicting a physical object of a first predefined type;
    select a first subset of the three-dimensional data that corresponds to the first subset of the two-dimensional data based on the generated correspondences; and
    determine, based on the first subset of the three-dimensional data, that the identified first portion of the image does not actually depict a physical object of the first predefined type.

11. The system of claim 10, wherein the computer-readable media of the computing device comprise further computer-executable instructions, which, when executed by the one or more processing units, cause the computing device to:
  generate a set of image features from the two-dimensional data captured by the digital camera; and
  generate a set of geometric features from the three-dimensional data captured by the lidar device;
  wherein the generating the correspondences between the subsets of the two-dimensional data and the subsets of the three-dimensional data comprises generating correspondences between image features in the generated set of image features and geometric features in the generated set of geometric features such that the first subset of the two-dimensional data corresponds to the first subset of the three-dimensional data, wherein the generating the correspondences was performed prior to the determining that the identified first portion of the image does not actually depict a physical object of the first predefined type.

12. The system of claim 10, wherein the computer-executable instructions that cause the computing device to determine, based on the first subset of the three-dimensional data, that the identified first portion of the image does not actually depict a physical object of the first predefined type comprise computer-executable instructions, which, when executed by the one or more processing units, cause the computing device to:

determine, based on the first subset of the three-dimensional data, that the identified first portion of the image depicts a physical object whose physical size, physical shape or physical location are inconsistent with physical objects of the first predefined type.

13. The system of claim 10, wherein the computer-executable instructions causing the computing device to perform the identifying and the determining, are part of a first classifier that generates a first classifier output identifying a first set of portions of the image as depicting physical objects of the first predefined type; and wherein further the computer-readable media comprise further computer-executable instructions, which, when executed by the one or more processing units, cause the computing device to:
assign a first weight to the first classifier output to generate a weighted first classifier output;
receive, from a second classifier, a second classifier output that identifies a second set of portions of the image as depicting physical objects of the first predefined type;
assign a second weight to the second classifier output to generate a weighted second classifier output; and
amalgamate the weighted first classifier output with the weighted second classifier output;
wherein the automatically identifying the portions of the image of the physical scene as depicting the physical objects of the predefined types is based on the amalgamating.

14. The system of claim 13, wherein the computer-readable media comprise further computer-executable instructions, which, when executed by the one or more processing units, cause the computing device to:
identify, utilizing the first and second classifiers, with their outputs weighted by the first and second weights, respectively, portions of a training image as depicting the physical objects of the predefined types;
compare the identified portions of the training image to known portions of the training image verified to depict the physical objects of the predefined types;
modify the first and second weights;
repeat the identifying the portions of the training image and the comparing utilizing the modified first and second weights; and
select, as selected first and second weights, those of the modified first and second weights that resulted in the identified portions of the training image being closest to the known portions.

15. The system of claim 10, wherein the first predefined type of physical object is one of: street signs, automotive license plates, construction signs, and commercial entity signs.

16. A method of automatically identifying portions of an image of a physical scene as depicting physical objects of predefined types in the physical scene, the method comprising the steps of:
generating a set of image features from two-dimensional image data that was obtained by two-dimensionally imaging the physical scene;
generating a set of geometric features from three-dimensional image data that was obtained by three-dimensionally measuring the physical scene coincidentally with the two-dimensional imaging of the physical scene;
generating correspondences between image features in the generated set of image features and geometric features in the generated set of geometric features;
identifying, based on a first subset of the image features, a first portion of the image of the physical scene as depicting a physical object of a first predefined type;
selecting a first subset of the geometric features that corresponds to the first subset of the image features based on the generated correspondences; and
determining, based on the first subset of the geometric features, that the identified first portion of the image does not actually depict a physical object of the first predefined type.

17. The method of claim 16, further comprising the steps of:
obscuring at least some of the portions of the images of the physical scene that are automatically identified as depicting the physical objects of the predefined types.

18. The method of claim 17, wherein the predefined types of the physical objects comprise automotive license plates.

19. The method of claim 16, wherein the determining, based on the first subset of the geometric features, that the identified first portion of the image does not actually depict a physical object of the first predefined type, comprises:
determining, based on the first subset of the geometric features, that the identified first portion of the image depicts a physical object whose physical size, physical shape or physical location are inconsistent with physical objects of the first predefined type.

20. The method of claim 16, wherein the correspondences between images features and geometric features comprise correspondences between multiple different geometric features and a single image feature.

* * * * *